United States Patent
Aoki

[11] 3,727,530
[45] Apr. 17, 1973

[54] DEVICE FOR SETTING FOCUSING DISTANCE IN CAMERA

[75] Inventor: Koichi Aoki, Toyokawa, Japan

[73] Assignee: Minolta Camera Kabushiki Kaiska, Osaka, Japan

[22] Filed: May 4, 1971

[21] Appl. No.: 140,076

[30] Foreign Application Priority Data

May 9, 1970 Japan ......................... 45/45411

[52] U.S. Cl. ................... 95/44 R, 88/1.5 NR, 356/8
[51] Int. Cl. ............................................. G03b 13/18
[58] Field of Search ................... 95/44 R; 356/2, 8, 356/21; 33/53 R; 88/1.5 R, 1.5 NR

[56] References Cited

UNITED STATES PATENTS

| 3,044,380 | 7/1962 | Baur | 356/8 XR |
|---|---|---|---|
| 2,253,948 | 8/1941 | Brown | 356/21 |
| 2,737,844 | 3/1956 | Jerome | 95/44 C X |
| 2,805,608 | 9/1957 | Leitz | 95/44 C |
| 2,919,623 | 1/1960 | Tronnier | 95/44 C X |
| 3,011,385 | 12/1961 | Frost | 88/1.5 NR |
| 3,031,764 | 5/1962 | Larson | 88/1.5 NR X |
| 3,272,103 | 9/1966 | Ploke | 88/1.5 NR X |
| 3,581,644 | 6/1971 | Baker | 95/44 C |
| 3,618,498 | 11/1971 | Eppinger | 88/1.5 R X |
| 3,619,202 | 11/1971 | Bellows | 88/1.5 R X |

FOREIGN PATENTS OR APPLICATIONS

| 530,662 | 7/1955 | Italy | 95/44 C |
| 541,035 | 3/1956 | Italy | 95/44 C |

*Primary Examiner*—Samuel S. Matthews
*Assistant Examiner*—Michael Harris
*Attorney*—Stanley Wolder

[57] ABSTRACT

A slit is formed in a viewfinder frame plate and an optical system projects approximately at the center of the finder field a an image of the slit having a definite length. By the coincidence of the slit image with the image in the finder field of a subject having a foreknown size, the camera can be set for the focusing distance. The optical system for producing the slit image includes a masking member movable across the slit image light path to permit the slit image to appear or disappear in operative relation with the focusing movement of the lens.

9 Claims, 6 Drawing Figures

Patented April 17, 1973  3,727,530

INVENTOR
KOICHI AOKI

BY Stanley Woeder
ATTORNEY

Patented April 17, 1973 3,727,530

INVENTOR
KOICHI AOKI

BY
Stanley Weder
ATTORNEY

DEVICE FOR SETTING FOCUSING DISTANCE IN CAMERA

BACKGROUND OF THE INVENTION

The present invention relates to a device for setting focusing distance in cameras, more particularly to a device for setting focusing distance suitable for use in cameras employing the zone focusing system.

With a camera having a simple structure for zone focusing, it has already been known to measure the subject distance by the eye and then set the scale on focusing member distance the lens to the distnace measured. It is also known to set the mark on the distance scale to a symbol indicating the focusing zone.

For the subjects in distant zone which are covered by a great depth of field, there arises no particular problem in taking photographs by a camera of the above-mentioned type, but if it is attempted to photograph a subject in near zone with such camera based upon the distance determined by the eye, the error in determination of the distance is liable to result in a blurred image, since the depth of field for such subject is small. Thus with the camera of the foregoing type it is very difficult to determine the distance accurately.

Another fault often experienced with a camera of the type referred to above is that the photographer, after making an exposure for a subject in near zone, is likely to photograph another subject in medium zone without changing the focus setting and a blurred image will therefore result. Moreover, such fault will frequently arise since the photographer is much more likely to photograph subjects in medium zone than those in distant and near zones.

With some cameras, the viewfinder may even indicate a focusing zone by a symbol, but the photographer will sometimes overlook the symbol to experience misfocusing.

To sum up, conventional cameras of the zone focusing type can not be free from failure in measuring the focusing distance and in setting the lens at focusing distance.

SUMMARY OF THE INVENTION

An object of the present invention is to provide a camera of the zone focusing type which from the camera. free from errors in focusing distance setting and in which the distance can be determined with ease and accuracy.

Another object of this invention is to provide a device for clearly indicating within the finder field a signal for measuring the focusing distance so as to eliminate the incidence of overlooking the signal.

Another object of this invention is to provide a device adapted to permit the signal to appear in or disappear from the finder field in accordance with the amount of focusing movement of the lens.

Still another object of this invention is to provide a device which is capable of eliminating the signal to be indicated in the finder field when so desired.

In accordance with this invention, the viewfinder frame plate is formed with a slit for passing light so as to permit the light passing through the slit to produce a signal approximately at the center of the finder field, the signal having a given length such that it is substantially equal to the size of a subject image which can be known beforehand, for example, to the lateral width of face of image of a human subject. By the coincidence of the length of the signal with the lateral width of the human face image in the finder field, the focusing distance setting can be achieved.

The lateral width of face of the human subject as seen in the finder field is substantially uniform whether the person is male or female, young or old. Accordingly, the focusing distance can be automatically determined by bringing the length of the signal and the width of the face into coincidence within the finder field.

The device of this invention further includes a lever disposed in the optical system for producing the signal and adapted to function in operative relation with focusing movement of the taking lens and to thereby permit the signal to appear in or disappear from the finder field in accordance with the focusing movement. Thus, the appearance of the signal in the finder field indicates that the lens is focused on subjects in near zone, whereas while the signal is eliminated it is seen that the lens is focused on those in distant zone. Furthermore, the signal may be divided longitudinally into suitable segments, or several signals having different lengths may be selectively produced or eliminated in operative relation with the focusing movement, whereby the respective signals can be adapted for focusing distance settings for near, medium and distant zones.

In accordance with the present invention, therefore, the lens can be set for near focusing distance by bringing the length of the signal and the lateral width of face of human subject image into coincidence within the finder field. The distance setting thus effected assures accurate determination of the distance and serves to elimate blurring without requiring any special skill. Because the signal is produced approximately at the center of the finder field, the photographer will never fail to notice the signal and misfocusing will be avoided.

Other objects and features of this invention will become more apparent from the following descrip-tion of the embodiments.

DESCRIPTION OF THE PREFERRED EMBODIMENTS

Figure 1:
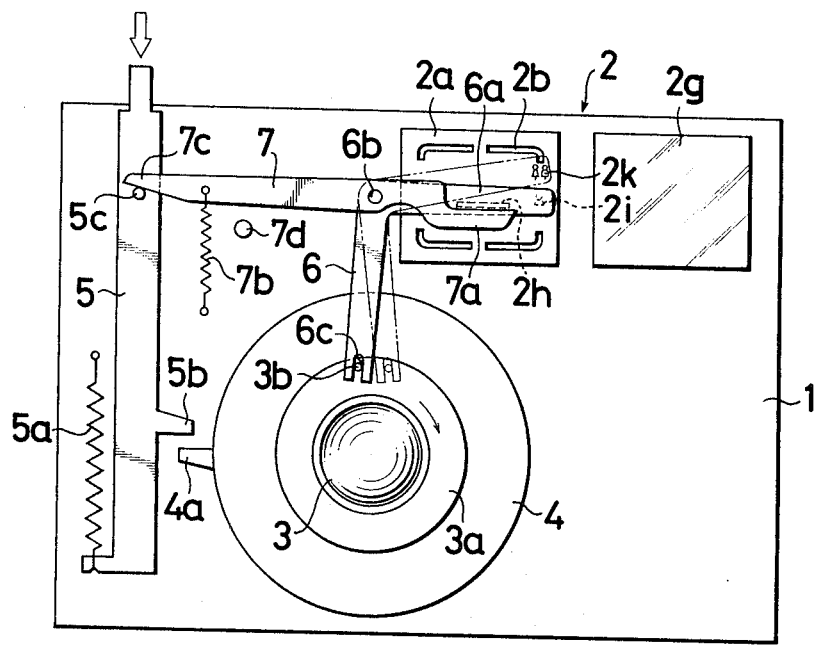
FIG. 1 is a schematic front view showing the principal part of a camera embodying this invention.
Figure 2:
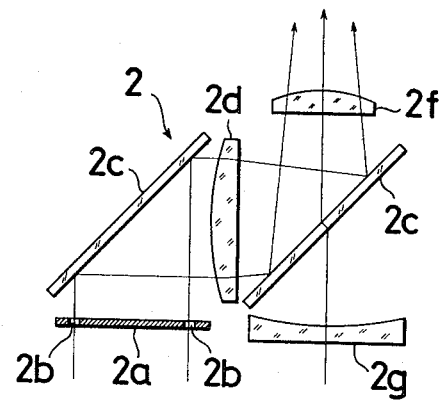
FIG. 2 is a plan view showing the optical system of viewfinder of the camera.
Figure 3:
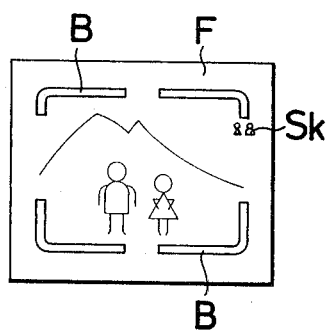
FIGS. 3 and 4 are diagrams showing the image in the finder field of the camera embodying this invention.

Referring to the drawings, indicated at 1 is a camera body and at 2 a viewfinder. As already known the viewfinder 2 includes an optical system comprising a finder frame plate 2a formed with a finder frame 2b for producing an image frame B on opaque plate, a total reflecting mirror 2c, a convex lens 2d, semi-transparent mirror 2e, an eyepiece 2f and an objective 2g. The camera includes a taking lens 3, a shutter unit 4, a shutter release lever 4a, and a shutter release member 5. The shutter release member 5 is urged upward by a tension spring 5a and adapted to be depressed for shutter release as indicated by an arrow. Disposed close to the shutter release lever 4a is a projection 5b which pushes the shutter release lever 4a for shutter release when the shutter release member 5 is depressed.

Figure 4:
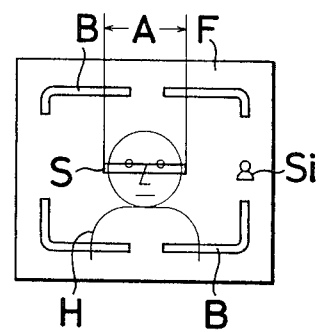

The frame plate 2a in the above structure is formed, approximately at its center, with a slit 2h for passing the light. Provision of the slit 2h produces a signal S having a given length A as shown in FIG. 4 and positioned approximately at the center of the finder field F in a horizontal direction. The length A of the signal S is such that when the lens 3 is focused on subjects in near zone it is approximately equal to the lateral width of face of human subject image H within the finder field F. Such width of face of the human image H within the finder field is substantially uniform whether the person is male or female, young or old, insofar as the focused distance is constant. Thus, such subject serves most advantageously as a subject whose size can be known beforehand.

A symbol Si for near zone is provided on one side of the finder frame beside the signal S. When the lens 3 is focused on the subject in near zone, the symbol Si appears in the finder field along with the signal S.

A symbol Sk for usual focusing zone is positioned above the symbol Si. When the lens is set for usual focusing zone, i.e., focused on subjects in medium and distant zones, the symbol Sk appears in the finder field. To permit the symbols Si and Sk to appear in the finder field F, cutouts 2i and 2k for passing light are formed in the finder frame plate 2a.

The camera further includes a mechanism for allowing the symbols to appear in the finder field F in operative relation with the focusing movement of the lens 3. This mechanism comprises an L-shaped lever 6 pivoted to the camera body on a pin 6b and having an arm 6a which is adapted to mask the front of slit 2h and the cutout 2i providing the symbol Si for near zone. The crotched portion 6c at the lower end of the lever 6 is engaged with a pin 3b on a member 3a which is rotated by the focusing movement of the lens 3, so that in operative relation with the focusing movement of the lens 3, the L-shaped lever 6 is moved pivotally about the pin 6b.

The arrangement is such that when the lens 3 is set in position for usual focusing distance (i.e., focused on subjects in medium and distant zones), the L-shaped lever 6 masks the front of the slit 2h and cutout 2i with its arm 6a, leaving the cutout 2k alone exposed as indicated in solid line in FIG. 1. As a result, only the symbol Sk for usual focusing distance appear in the finder field F to indicate that the lens is not set for near focusing distance.

When the rotary member 3a is turned in the direction of an arrow in FIG. 1 to focus the lens 3 on the subject in near zone, the L-shaped lever 6 is pivotally moved in operative relationship with the focusing movement and the arm 6a is therefore brought upward to the position indicated in imaginary line in FIG. 1 to expose the slit 2h and cutout 2i and mask the front of the cutout 2k providing the symbol Sk for usual focusing distance. Accordingly, the signal S having a given length and the symbol Si for near focusing distance appear in the finder field F and the symbol Sk for usual focusing distance is eliminated.

An elimination lever 7 is used to eliminate the signal S positioned approximately at the center of the finder field F when it is detrimental to the determination of the scene to be photographed. The lever 7 is pivoted on the pin 6b supporting the L-shaped lever 6 or at some other suitable position. Under the action of the spring 7b, the lever 7 is urged in a counterclockwise direction in FIG. 1 with its tail end 7c in engagement with a projection 5c to follow the movement of the projection 5c on the shutter release member 5. The front end 7a of the lever 7 is positioned below the slit 2h of the frame plate 2a. When the shutter release member 5 is slightly depressed (with shutter still retained in cocked position), the front end 7a masks the slit 2h to remove the signal S from the finder field F. When the shutter release member 5 is depressed further downward for shutter release, the elimination lever 7 would move further in counterclockwise direction following the projection 5 on the shutter release member 5, but such movement is limited by a stopper 7d, which therefore serves to keep the signal S eliminated. The spring 7b acting on the elimination lever 7 is of course weaker than the spring 5a loaded on the shutter release member 5 to return the same upward. When the shutter release member 5 is returned to the upper position, the lever 7 is also brought back to the position shown in FIG. 1, with the front end 7a retracted to the position below the slit 2h of the frame plate 2a.

Thus the signal S appears or disappears in operative relationship with the focusing movement and in photographing a subject in near zone, focusing is achieved by coincidence of the lateral width of face of the human image H and the length A of the signal S in the finder field. In case of noncoincidence, the camera may be moved toward or away from the subject, or the subject may be moved toward or away front thecamera. In focusing in this manner, the length A of the signal S and the width of the face of the human image may not necessarily be brought into strict coincidence since the subject is covered in the depth of field.

In the state where the lens 3 is focused for near zone photographing operation, the signal S is always present approximately at the center of the finder field, so that the photographer will never fail to notice the signal S and there will be no faulty possibility of photographing subjects in medium or distant zone with near zone focus setting.

Figure 5:
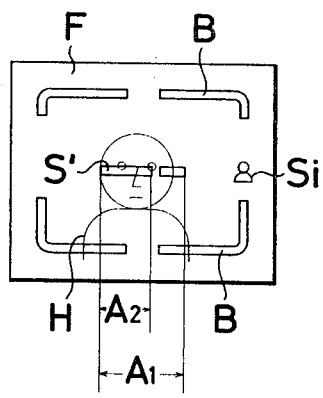
FIG. 5 is a diagram showing the image in the finder field, with signal modified in form.
Figure 6:
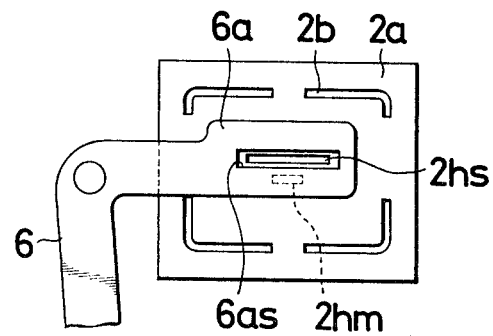
FIG. 6 is a front view showing the finder frame plate in another modified embodiment.

To indicate the limits of focused zone defined by the depth of field, the length of signal S' may be defined, as shown in FIG. 5, in two lengths of $A_1$ and $A_2$ which correspond to the lateral widths of face of image of the human subject at the near and far points of the focused zone covered by the lens focused on near zone. With this arrangement, focusing is ensured if the lateral width of face of the human subject as seen in the finder field is greater than the length $A_2$ and smaller than the length $A_1$ of the signal S'.

The foregoing embodiments contemplate two-point focus settings for near and usual focusing zones. For focus settings at least at three points, the finder frame plate 2a may be formed with a slit 2hs for producing a signal for near zone photographing operation and a slit 2hm for a signal for medium zone photographing operation, with a slit 6as formed in the arm 6a of the L-shaped lever, the arrangement being such that in accordance with the amount of focusing movement, the slit $2hs$ or $2hm$ may be exposed or both may be masked to produce or eliminate a signal corresponding to the amount of focusing movement, approximately at the center of the finder field.

I claim:

1. A camera comprising:

a view finder;

a plate provided with a slit;

optical means for directing an image of said slit to the center of the view finder field, said slit image directed to the center of said finder field having the same length as a corresponding dimension of an object of a known size at a predetermined short distance seen in said finder field;

an objective lens;

means for adjusting the focus of said objective lens; a masking member movable between a first position intercepting the light path of said slit image to the center of said finder field and a second position offset from said light path, and means interlocking said adjusting means and said masking member for positioning said masking member in said first position when said objective lens is focused for a long distance and in said second position when said objective lens is focused for a short distance.

2. The camera as set forth in claim 1, wherein said view finder comprises a frame plate provided with a set of slots forming a rectangular frame and optical means for directing the images of said set of slots to said finder field as bright frame, said slit being provided in the center of said frame plate.

3. The camera as set forth in claim 1, wherein said camera comprises a focusing ring rotatable with said objective lens, and said masking member and interlocking means comprise a rotatable lever whose one end engages said distance setting ring and whose other end reciprocates between said first and second positions in accordance with the rotation of said ring.

4. The camera as set forth in claim 1, wherein said slit comprises two linearly aligned portions, the combined length of said two portions as an image in said finder field being equal to that of the finder image of an object of a known size at said predetermined short distance and the length of one of said two portions being equal to that of the finder image of an object of a known size at a predetermined medium distance.

5. The camera as set forth in claim 1, wherein two parallel slits of different lengths are located on said plate, the length of the image of said longer slit viewed in said finder being equal to a corresponding dimension of the image of an object of a known size at said predetermined short distance, and the length of the image of said shorter slit being equal to that of the finder image of an object of a known size at a predetermined medium distance; said masking member being movable between said first position masking both of said slits, said second position masking said longer slit and a third position masking said shorter slit; and said interlocking means positioning said masking member in said first position for said long distance and in said second position for said medium distance and in said third position for said short distance in accordance with the focusing of said objecting lens.

6. The camera as set forth in claim 1, wherein said plate is further provided with a short distance symbol mark in a portion masked by said masking member only when in said first position and with a long distance symbol mark in a portion masked by said masking member only when in said second position.

7. The camera as set forth in claim 1, wherein the length of said slit image is equal to the width in said finder field of a human head at said predetermined short distance.

8. The camera as set forth in claim 1, wherein a second masking member is provided which is movable between said first position intercepting said light path of said slit image to said finder field and said second position offset from said light path.

9. The camera as set forth in claim 8, wherein said second masking member comprises a rotatable lever, whose one end engages the camera shutter release member and whose other end is located in said first position when said shutter release member is depressed and in said second position when said shutter release member is not depressed.

* * * * *